(No Model.)
G. E. BIERBACH.
BICYCLE REST AND REPAIR STAND.
No. 577,910. Patented Mar. 2, 1897.
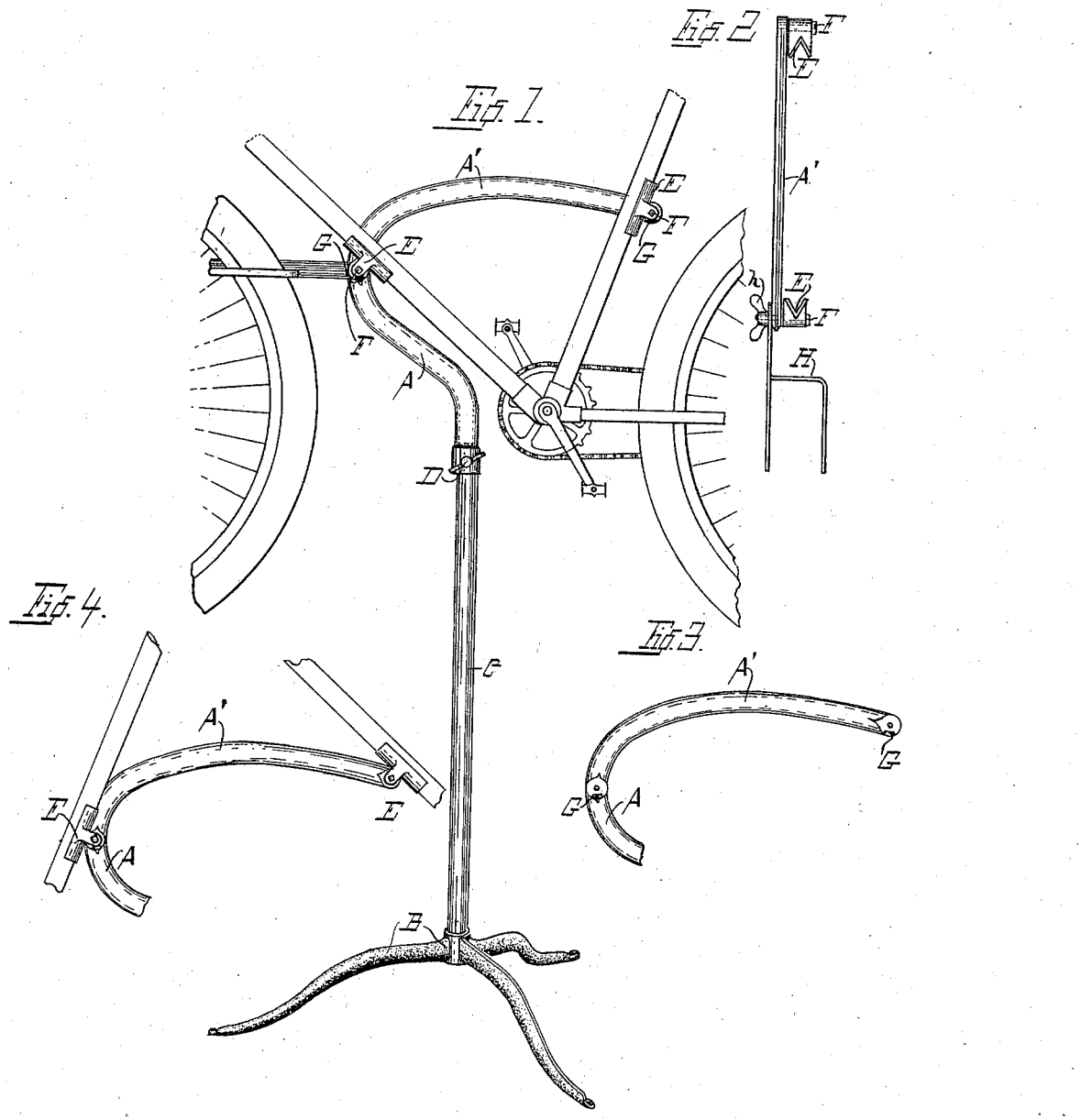
Witnesses:
F. A. Otto.
C. L. Roesch.
Inventor
George E. Bierbach
By Erwin Wheeler & Wheeler
Attorneys.

UNITED STATES PATENT OFFICE.

GEORGE E. BIERBACH, OF MILWAUKEE, WISCONSIN.

BICYCLE REST AND REPAIR STAND.

SPECIFICATION forming part of Letters Patent No. 577,910, dated March 2, 1897.

Application filed June 6, 1896. Serial No. 594,466. (No model.)

*To all whom it may concern:*

Be it known that I, GEORGE E. BIERBACH, a citizen of the United States, residing at Milwaukee, in the county of Milwaukee and State of Wisconsin, have invented new and useful Improvements in Bicycle Rest and Repair Stands, of which the following is a specification.

My invention relates to improvements in bicycle rest and repair stands.

The object of my invention is, first, to provide a neat and durable form of stand which will hold a bicycle rigidly, and which can be constructed with very little expense; second, to provide a form of stand adapted to hold a bicycle in either an upright or downward position.

In the following description reference is had to the accompanying drawings, in which—

Figure 1 is a side elevation showing a portion of the bicycle-frame as it is held therein. Fig. 2 is a top view of the curved holding-arm. Fig. 3 is a side view of the holding-arm, with the holding-plates removed to show the stop-lugs. Fig. 4 is a side view of the holding-arm, showing the plate in a reversed position.

Like parts are identified by the same reference-letters throughout the several views.

The curved or sickle-shaped malleable-iron arm or bar A is supported from a cast tripod base B by a standard C, the latter being preferably formed of gas-pipe. The end of the arm A is inserted in or over the top of the pipe C and held thereto by a thumb-screw D.

E E are V-shaped holding-plates pivotally supported by bolts F on one side of the upper portion A' of the arm A, and adapted to engage the diverging frame-rods of a bicycle and permit the latter to wedge itself firmly between them.

G G are lugs or stops adapted to prevent the holding-plates from swinging out of position to engage the frame-rods.

H is a wheel-holding fork regulated by a thumb-screw h.

In Fig. 4 I have illustrated my device as it is when employed to hold the bicycle in a reversed position. The holding-plates are reversed so as to engage the frame-rods on the inside, and the lugs G being elongated it will be observed that the plates are held in position for engagement with the rods as well as when in the upright position.

Having thus described my invention, what I claim as new, and desire to secure by Letters Patent, is—

1. A bicycle-stand, consisting in the curved arm or bar located upon a suitable support, and having on one side thereof two pivotally-attached holding-plates adapted to engage the frame-rods of a bicycle and permit the latter to become wedged in between them, substantially as described.

2. A bicycle rest and repair stand, consisting in the combination with a suitable support, of the sickle-shaped arm or bar attached at one end to the support, and provided with pivotally-attached V-shaped holding-plates adapted to engage the frame-rods of a bicycle, and permit the latter to become wedged in between them, together with lugs or stops formed on the side of the arm and adapted to prevent said holding-plates from swinging out of a position to engage the frame-rods, substantially as described.

3. A bicycle rest and repair stand, consisting in the combination with a suitable support, of the arm or bar attached to the support, and provided with pivotally-attached reversible holding-plates, and a lug or stop attached to said arm or bar, and adapted to hold said plates in a position for engaging the frame-rods in either an upright or reversed position, substantially as described.

In testimony whereof I affix my signature in the presence of two witnesses.

GEORGE E. BIERBACH.

Witnesses:
E. J. PATTERSON,
WINNIFRED TIMLIN.